Patented Feb. 23, 1932

1,846,300

UNITED STATES PATENT OFFICE

LESLIE GEORGE SCOTT BROOKER, OF ROCHESTER, NEW YORK, ASSIGNOR TO EASTMAN KODAK COMPANY, OF ROCHESTER, NEW YORK, A CORPORATION OF NEW YORK

PHOTOGRAPHIC EMULSION

No Drawing. Application filed February 2, 1929, Serial No. 337,177. Renewed October 17, 1930.

This invention relates to a new composition of matter and particularly to a new photographic sensitizing dye and a method of preparation thereof as well as a photographic emulsion containing dyes.

It is well known that photographic emulsions which owe their light sensitiveness to the silver halides alone are strongly affected by the short waves of blue, violet, and ultraviolet light, but are practically insensitive to the longer waves. It was shown by H. W. Vogel in 1873 that the sensitivity of the silver halides could be greatly extended by addition to the emulsions containing them certain dyes which absorb the light rays which it is desired to photograph. Since that time, numerous dyes have been suggested and used with varying degrees of success.

Among the earlier dyes is found cyanine, which, although it was a sensitizer towards red light, was not generally used, due to its excessive fogging action on the emulsion. A great deal of work has been done on synthesizing dyes more or less closely related to cyanine. Pseudocyanine, sensitol red, kryptocyanine, thiocarbocyanine and others have increased markedly the light sensitive range of the photographic emulsion. As is well known, for instance, in the publications of Vogel and many others subsequent thereto, sensitizing dyes act upon the silver halide grains contained in a photographic emulsion in such a way as to greatly increase the responsiveness to light in general, and certain bands of the spectrum in particular, of those silver halide grains. This effect is obtained by merely incorporating a small amount of the sensitizing dye in the photographic gelatino-silver-halide emulsion, the emulsion being spread upon a convenient transparent support such as a glass plate or cellulose derivative sheet to form the finished photographic element, as known to those skilled in the art of photography. For the details of such procedure, reference may be had to any of the published treaties upon photography.

An object of the present invention is to provide a new dye of the cyanine type having sensitizing qualities and a method of preparation. Another object of this invention is to provide a photographic emulsion containing this new dye and a photographic element including such an emulsion.

Dyes having sensitizing qualities have been prepared by the condensation of 1 methyl benzothiazole quaternary salts with ethyl orthoformate in dry pyridine. These dyes are known as thiocarbocyanines. They are carbocyanines because of the existence therein of the tri-methenyl chain $-CH=CH-CH=$ (a chain having the conjugate type of linkage), the name being first adopted by Mills & Pope in their article entitled "The carbocyanines"—page 253 of The Photographic Journal, November 1920, bottom of pages 254 and 265 being the pertinent portions; they are thiocarbocyanines because of the sulfur in the thiazole nucleus. I have discovered that thiocarbocyanines made by a method in which $\mu$ methyl naphthothiazole is substituted for 1 methyl benzothiazole sensitize further towards the red end of the spectrum than the previously known thiocarbocyanines. Thus 2:2' diethyl thiocarbocyanine iodide sensitizes to $\lambda$ 640 while the corresponding 2:2' diethyl dibenzothiocarbocyanine iodide sensitizes to $\lambda$ 700.

I will explain what I believe to be the molecular structure of the class of dyes which I have discovered and the intermediates from which it is prepared; but it will be understood that this is only a theoretical structure which is, however, very probably correct. In any case, my method of manufacture of dyes of this class will be described and from these recipes the dyes which are hereinafter claimed may be readily produced by those skilled in the art. The molecular structure is given to describe accurately and unquestionably this new composition of matter and its related equivalents.

*Example I.*—In the preparation of 2:2'-diethyl-5:6:5':6'-dibenzo-thiocarbocyanine bromide, one member of the series, I first prepare from beta naphthylamine a 1-methyl alpha naphthothiazole by known prescribed academic methods. This intermediate has the following structural formula:

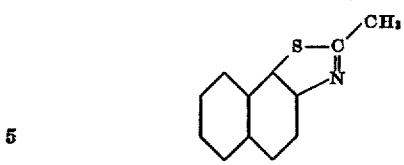

Step A: 2 molecular proportions of 1 methyl alpha naphthothiazole or a nuclear halogen substituted 1 methyl alpha naphthothiazole is condensed with 2 molecular proportions of ethyl p-toluene sulfonate by heating the substances together at 100° for 6 hours. Step B: The resulting crude product is dissolved in boiling dry pyridine and 4 molecular equivalents of ethyl ortho formate are added and the whole refluxed for 2 hours. Step C: The dye is precipitated from the pyridine solution as the bromide by adding excess of aqueous solution of ammonium bromide and crystallized from methyl alcohol, in which it gives a deep purplish blue solution. The bromide crystallizes in greenish brown needles. The several reactions are believed to be as follows.

Step A:

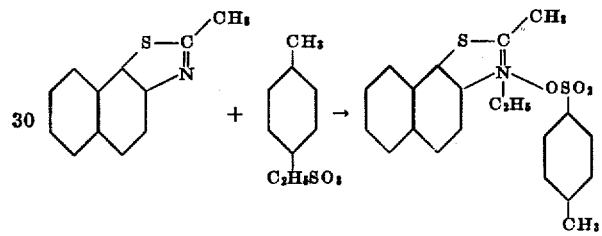

1 methyl alpha naphtho thiazole    Ethyl p. toluene sulfonate    1 methyl alpha naphthothiazole etho p-toluene sulfonate Step B:

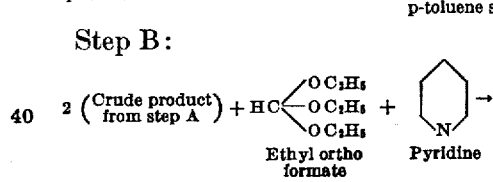

Ethyl ortho formate    Pyridine

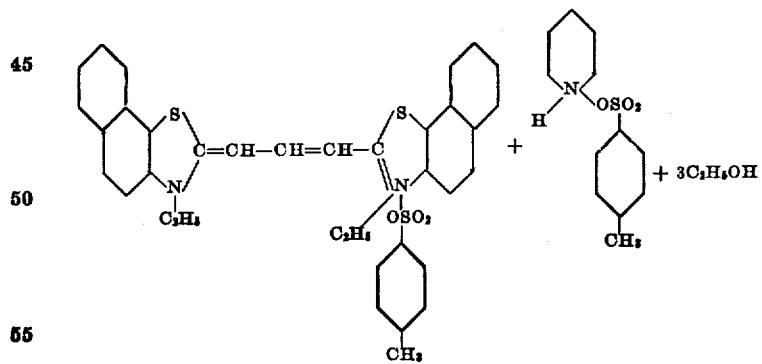

Step C:

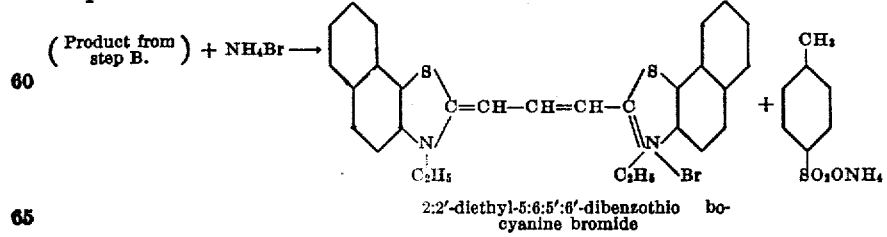

2:2'-diethyl-5:6:5':6'-dibenzothio bocyanine bromide

*Example II.*—One gram of 1-methyl alpha napthothiazole is heated with one gram of allyl iodide under reflux on a steam bath. The initial reaction is rapid and heating is continued for a further two and a half hours. The product is crystallized from methyl alcohol and washed with acetone. Yield 1.8 g.

The 1.8 g. 1-methyl alpha naphthothiazole allyl iodide is dissolved in 20 cc. boiling dry pyridine and boiled under reflux for 2 hours after adding 4 cc. ethyl ortho formate. On cooling, most of the dye separates out. It is filtered off and crystallized from methyl alcohol when it is obtained in beautiful green needles.

This dye is named 2:2'-diallyl-5:6:5':6'-dibenzo thiocarbocyanine iodide.

The numbering within the thiazole rings is, of course, arbitrary. The numbering herein given is in current usage for the thiocarbocyanine class of compounds. A dye derived from 2 methyl-beta naphthothiazole, for instance, will have the structure

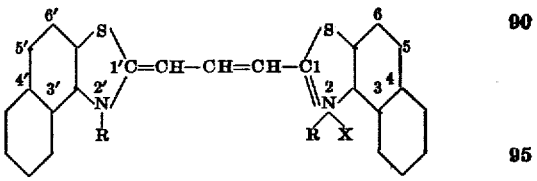

and will be called a 2:2'-dialkyl-3:4:3':4'-dibenzo thiocarbocyanine salt. A dye similarly derived from 1 methyl alpha naphtho thiazole will have the structure

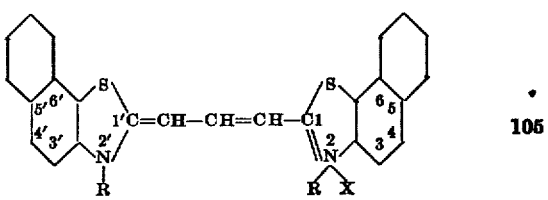

and in accordance with the numbering will be a 2:2'-dialkyl-5:6:5':6'-dibenzo thiocarbocyanine salt.

It is, of course, understood that numerous equivalents having the major naphthalene nucleus may be prepared and which may well be called 2:2' dialkyl (similar or dissimilar) 3:4:3':4' (or 5:6:5':6')-dibenzo-thiocarbocyanine salts. In the above example, the substitution may be affected by the use of an alkyl-p-toluene sulfonate, for example, methyl, ethyl, or propyl etc. p-toluene sulfonate. Any suitable acid radical may be used to precipitate the dye for example, a halide, p-toluene sulfonate, or alkylo sulfate or, in fact, any suitable acid radical which will not greatly decrease or destroy the sensitizing properties of the dye, this radical being necessary to give electrical neutrality to the molecule. In the claims the phrase—"a suitable acid radical"—is employed to designate this group of acid radicals.

The sulfur in the above structure may be replaced by oxygen, selenium or tellurium. However, I prefer the dye prepared from the thiazole, as it is more readily available. It is also obvious, that the alpha derivative or the unsymmetrical derivative may be prepared by starting with the 1 methyl alpha or a mixture of 1 methyl alpha and 2 methyl beta naphthothiazoles.

These dyes and the method of making them are not claimed in this application but in my copending application Serial No. 435,105 filed March 12, 1930. Various dyes having the hereinabove described nucleus and allied equivalents thereof may be used without departing from this invention or in any way sacrificing the advantages it affords.

Having thus described my invention, what I claim as new and desire to secure by Letters Patent is:

1. A photographic gelatino-silver-halide emulsion containing a cyanine dye of the thiocarbocyanine series which contains two naphthothiazole nuclei.

2. A photographic gelatino-silver-halide emulsion containing a cyanine dye of the thioarbocyanine series which contains two naphthothiazole nuclei, the nitrogen atoms of which are each linked to an alkyl radical while one is also linked to a suitable acid radical.

3. A photographic gelatino-silver-halide emulsion containing a cyanine dye of the thiocarbocyanine series which contains two naphthothiazole nuclei, the nitrogen atoms of which are linked to dissimilar alkyl radicals while one is also linked to a suitable acid radical.

4. A photographic gelatino-silver-halide emulsion containing a cyanine dye of the thiocarbocyanine series which contains two naphthothiazole nuclei, the nitrogen atoms of which are each linked to an ethyl group while one is also linked to a suitable acid radical.

5. A photographic gelatino-silver-halide emulsion containing a cyanine dye of the thiocarbocyanine series which contains two naphthothiazole nuclei, the nitrogen atoms of which are each linked to an ethyl group while one is linked to a bromine atom.

6. A photographic gelatino-silver-halide emulsion containing a cyanine dye of the thiocarbocyanine series which contains two naphthothiazole nuclei, the alpha derivative of which has the following structure:

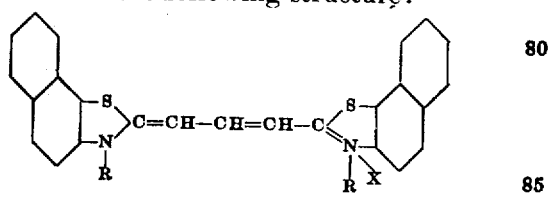

and the beta derivative of which has the following structure:

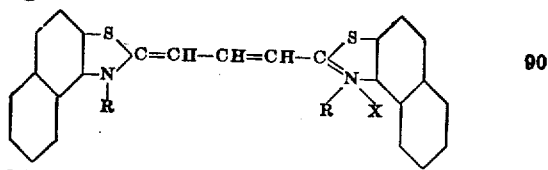

of which the R groups indicate alkyl and the X a suitable acid radical.

7. A photographic gelatino-silver-halide emulsion containing a cyanine dye of the thiocarbocyanine series which contains two naphthothiazole nuclei, the alpha derivative of which has the following structure:

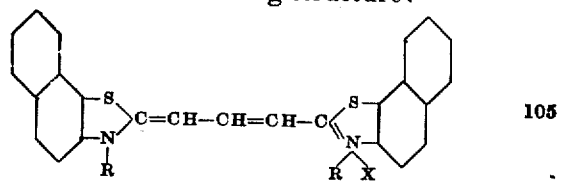

and the beta derivative of which has the following structure:

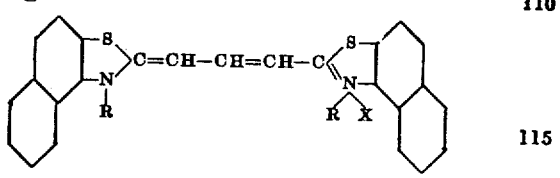

of which the R group indicates an alkyl and the $R_1$ a different alkyl group and the X a suitable acid radical.

8. A photographic gelatino-silver-halide emulsion containing a 2:2' diethyl dibenzo thiocarbocyanine bromide the alpha derivative of which has the following structure:

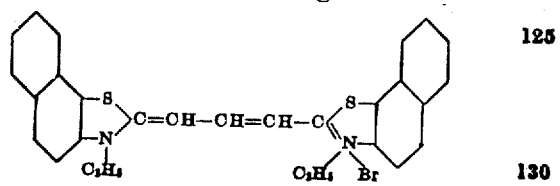

and the beta derivative of which has the following structure:

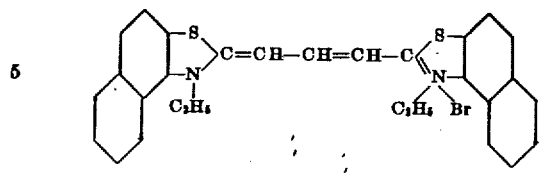

9. As a new product, a photographic film coated with a gelatino-silver-halide emulsion containing a cyanine dye of the thiocarbocyanine series containing two naphthothiazole nuclei.

10. A photographic gelatino-silver-halide emulsion containing a cyanine dye which contains a naphthothiazole nucleus and a nitrogen-containing heterocyclic nucleus, the nitrogen atoms of the two nuclei being connected by a chain consisting of an uneven number of carbon atoms and the linkages of this chain being conjugated.

11. A photographic gelatino-silver-halide emulsion containing a cyanine dye which contains two naphthothiazole nuclei linked together by a tri-methenyl chain.

12. A photographic gelatino-silver-halide emulsion containing a cyanine dye which contains two beta-naphthothiazole nuclei linked together by a tri-methenyl chain.

13. A photographic gelatino-silver-halide emulsion containing a 2:2' dialkyl dibenzo thiocarbocyanine salt.

14. A photographic gelatino-silver-halide emulsion containing a 2:2' diethyl dibenzo thiocarbocyanine salt.

15. A photographic gelatino-silver-halide emulsion containing a 2:2' dimethyl dibenzo thiocarbocyanine salt.

Signed at Rochester, New York, this 25th day of January 1929.

LESLIE G. S. BROOKER.

and the beta derivative of which has the following structure:

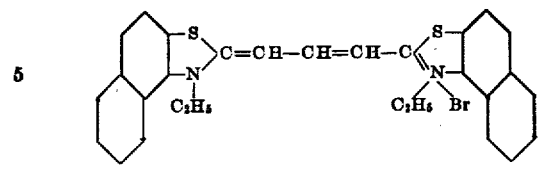

9. As a new product, a photographic film coated with a gelatino-silver-halide emulsion containing a cyanine dye of the thiocarbocyanine series containing two naphthothiazole nuclei.

10. A photographic gelatino-silver-halide emulsion containing a cyanine dye which contains a naphthothiazole nucleus and a nitrogen-containing heterocyclic nucleus, the nitrogen atoms of the two nuclei being connected by a chain consisting of an uneven number of carbon atoms and the linkages of this chain being conjugated.

11. A photographic gelatino-silver-halide emulsion containing a cyanine dye which contains two naphthothiazole nuclei linked together by a tri-methenyl chain.

12. A photographic gelatino-silver-halide emulsion containing a cyanine dye which contains two beta-naphthothiazole nuclei linked together by a tri-methenyl chain.

13. A photographic gelatino-silver-halide emulsion containing a 2:2' dialkyl dibenzo thiocarbocyanine salt.

14. A photographic gelatino-silver-halide emulsion containing a 2:2' diethyl dibenzo thiocarbocyanine salt.

15. A photographic gelatino-silver-halide emulsion containing a 2:2' dimethyl dibenzo thiocarbocyanine salt.

Signed at Rochester, New York, this 25th day of January 1929.

LESLIE G. S. BROOKER.

CERTIFICATE OF CORRECTION.

Patent No. 1,846,300.  Granted February 23, 1932, to

LESLIE GEORGE SCOTT BROOKER.

It is hereby certified that error appears in the printed specification of the above numbered patent requiring correction as follows: Page 1, line 5, after the word "containing" insert the word such, and line 46, for the word "treaties" read treatises; page 2, line 65, in the formula, for the word "-dibenzothio bo-" read -dibenzothiocarbo-; page 3, line 49, claim 2, for the misspelled word "thioarbocyanine read thiocarbocyanine; and that the said Letters Patent should be read with these corrections therein that the same may conform to the record of the case in the Patent Office.

Signed and sealed this 3rd day of May, A. D. 1932.

(Seal)

M. J. Moore,
Acting Commissioner of Patents.

CERTIFICATE OF CORRECTION.

Patent No. 1,846,300.                      Granted February 23, 1932, to

LESLIE GEORGE SCOTT BROOKER.

It is hereby certified that error appears in the printed specification of the above numbered patent requiring correction as follows: Page 1, line 5, after the word "containing" insert the word such, and line 46, for the word "treaties" read treatises; page 2, line 65, in the formula, for the word "-dibenzothio bo-" read -dibenzothiocarbo-; page 3, line 49, claim 2, for the misspelled word "thioarbocyanine read thiocarbocyanine; and that the said Letters Patent should be read with these corrections therein that the same may conform to the record of the case in the Patent Office.

Signed and sealed this 3rd day of May, A. D. 1932.

(Seal)                                                       M. J. Moore,
                                                               Acting Commissioner of Patents.